(12) United States Patent
Kawakami et al.

(10) Patent No.: US 8,106,341 B2
(45) Date of Patent: Jan. 31, 2012

(54) LASER ANNEALING APPARATUS AND METHOD

(75) Inventors: Ryusuke Kawakami, Kanagawa (JP); Norihito Kawaguchi, Tokyo (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 94 days.

(21) Appl. No.: 12/355,871

(22) Filed: Jan. 19, 2009

(65) Prior Publication Data

US 2009/0218475 A1  Sep. 3, 2009

(30) Foreign Application Priority Data

Jan. 24, 2008 (JP) .................................. 2008-013766

(51) Int. Cl.
 G02B 7/04 (2006.01)
 G06M 7/00 (2006.01)
 G01B 11/14 (2006.01)
 B23K 26/00 (2006.01)

(52) U.S. Cl. ............... 250/201.2; 250/221; 356/614; 219/121.77

(58) Field of Classification Search .............. 250/221, 250/234–236, 206.1, 206.2, 208.1, 202, 206.3, 250/216, 559.37, 559.44, 201.2–201.3, 201.7, 250/559.3, 559.4; 356/152.1–152.3, 3.1, 356/153, 237.1–237.5, 399–401, 614; 359/212, 359/226.1; 219/121.73–121.79
See application file for complete search history.

(56) References Cited

U.S. PATENT DOCUMENTS 4,504,147 A * 3/1985 Huang .......................... 356/510
6,483,106 B1 * 11/2002 Ohtomo et al. ............... 250/236
2005/0169330 A1 8/2005 Hongo et al.
2008/0049284 A1 * 2/2008 Park et al. ..................... 359/196

FOREIGN PATENT DOCUMENTS

| EP | 1 926 131 A1 | 5/2008 |
|---|---|---|
| EP | 1 973 149 A1 | 9/2008 |
| JP | 2000-42777 | 2/2000 |
| JP | 2002-158186 | 5/2002 |
| JP | 2003-45820 | 2/2003 |
| JP | 2004-95792 | 3/2004 |
| JP | 2005-217209 | 8/2005 |
| JP | 2006-287183 | 10/2006 |
| JP | 2007-110064 | 4/2007 |
| JP | 2007-214527 | 8/2007 |

* cited by examiner

Primary Examiner — Georgia Y Epps
Assistant Examiner — Don Williams
(74) Attorney, Agent, or Firm — Husch Blackwell LLP

(57) ABSTRACT

The irradiation unevenness caused by drift occurring in a beam short-axis direction is reduced without adding a new beam shaping unit and affecting the propagation characteristic of a beam in an optical resonator. A position deviation detector for detecting a position deviation of a laser beam before passing through a beam shaping optical system, an angle deviation detector for detecting an angle deviation of the laser beam before passing through the beam shaping optical system, a deflection mirror for deflecting the laser beam, which is disposed in an optical path between a laser and an object (substrate), and a mirror controller for controlling orientation of the deflection mirror, based on detection data obtained using the position deviation detector and the angle deviation detector so as to eliminate the position deviation from a reference irradiation position in the short-axis direction of a linear beam on a surface to be irradiated.

7 Claims, 7 Drawing Sheets

LASER ANNEALING APPARATUS AND METHOD

BACKGROUND OF THE INVENTION

1. Field of the Invention

The present invention relates to laser annealing apparatus and method for performing an annealing process on an object to be processed by irradiating the object with a linear beam.

2. Description of the Related Art

In a process for manufacturing thin film transistors used for liquid crystal semiconductor devices, a laser annealing apparatus is used in order to modify a substrate (a semiconductor substrate or a glass substrate) by irradiating the substrate with a laser beam. The modification of the substrate includes crystallization of an amorphous semiconductor thin film such as an amorphous silicon film and activation of impurities added to a semiconductor film.

FIG. 5 is a schematic view of a conventional laser annealing apparatus 30. In the laser annealing apparatus 30, a laser beam 32 emitted from a laser 31 is shaped into a beam with a linear cross section through a beam shaping optical system 33. This linear beam scans a substrate 34, which is an object to be irradiated, in a short-axis direction of the beam (an X direction in the figure); thus, a desired region over the substrate 34 is irradiated with the laser beam (see, for example, Patent Document 1: Japanese Published Patent Application No. 2006-287183). Accordingly, the substrate 34 is modified.

In such a laser annealing apparatus 30, in general, the beam position is fixed and the substrate 34 is mounted on a substrate stage. Then, the beam scan is performed while moving the substrate in the short-axis direction of the linear beam. Here, the stability in directivity and the stability in positioning of the laser beam 32 are not zero and its emission position or emission angle is deviated from that of a reference beam. In FIG. 5, an angle-deviated beam 35 and a position-deviated beam 36 are schematically illustrated. If such a position deviation or angle deviation occurs in the short-axis direction of the linear beam, the beam position on the surface to be irradiated moves back and forth in terms of time in the short-axis direction (X direction) of the beam hereinafter this phenomenon is called "drift"). As a result of the drift occurring in the short-axis direction of the beam, the irradiated region on the substrate 34 includes a region where the irradiation time with the laser beam 32 is relatively long and a region where it is relatively short.

Accordingly, irradiation unevenness that can be observed even with human eyes appears along the short-axis direction of the beam (the substrate moving direction) as shown in FIG. 6. Since this unevenness is observed over a region of about several millimeters, it is considered that the beam is deviated in angle or position for about several seconds. If thin film transistors are manufactured using a substrate including such unevenness, transistor characteristics vary because crystal quality is different in accordance with the unevenness.

In response to such problems, Patent Document 2 (Japanese Published Patent Application No. 2000-42777) has disclosed a technique for minimizing the drift.

FIG. 7 illustrates a structure of a drift correction device 41 of a laser process apparatus 40 disclosed in Patent Document 2. In FIG. 7, the drift correction device 41 includes a laser 42 including a pair of reflection mirrors 43 and 44 which forms an optical resonator; a beam shaping unit 51 for changing a laser beam emitted from the laser 42 into a linear beam with a narrow cross section; a beam center position detection device (a line sensor 45 and a profile position calculation device 46) for detecting a center position in a width direction of the beam after passing through the beam shaping unit 51; and an orientation control mechanism (a drift amount calculation device 47, a mirror angle calculation device 48, a rear mirror rotation drive device 49, and a front mirror rotation drive device 50) which, in the case where the detected center position P is deviated by the beam drift, changes the orientation θf and/or θr of at least one reflection mirror of the optical resonator so as to eliminate the deviation ΔP. Further, in FIG. 7, the laser process apparatus 40 includes a beam homogenizer 52 for shaping and condensing a laser beam into a linear beam with a narrow cross section on a surface of a substrate 53.

With the use of the drift correction device 41 having such a structure, the deviation ΔP is calculated based on the beam center position detected by the line sensor 45. The orientation θf and/or θr of at least one reflection mirror of the optical resonator is changed so as to eliminate this deviation ΔP. Accordingly, the drift of the laser beam on the surface of the substrate 53 is suppressed.

SUMMARY OF THE INVENTION

The drift correction device 41 disclosed in Patent Document 2 needs to be provided with the beam shaping unit 51 in addition to the beam homogenizer 52 for irradiating a substrate, in order to specify the beam center position. Therefore, drastic rise in production cost and increase in size of the laser annealing apparatus are inevitable. Moreover, when the orientation of at least one reflection mirror of the optical resonator is changed in the drift correction device 41 of Patent Document 2, the propagation characteristic of the beam in the optical resonator is changed, which affects the laser output significantly, for example. Therefore, the drift correction device 41 disclosed in Patent Document 2 is not practical.

The present invention has been made in view of these problems, and it is an object of the present invention to provide laser annealing apparatus and method for reducing irradiation unevenness caused by drift occurring in a short-axis direction of a beam without adding a new beam shaping unit and without affecting the propagation characteristic of the beam in the optical resonator.

In order to solve the above problems, the laser annealing apparatus and method of the present invention employs the following technical means.

An aspect of the present invention is a laser annealing apparatus for performing an annealing process on an object to be processed by shaping a laser beam emitted from a laser into a linear beam with a linear cross section through a beam shaping optical system and by irradiating the object with the linear beam. The laser annealing apparatus includes a position deviation detector for detecting a position deviation of a laser beam before passing through the beam shaping optical system, from a reference position in a direction corresponding to a short-axis direction of the linear beam; an angle deviation detector for detecting an angle deviation of the laser beam before passing through the beam shaping optical system, from a reference angle in a direction corresponding to the short-axis direction of the linear beam; a deflection mirror for deflecting the laser beam, which is disposed in an optical path between the laser and the object to be processed; and a mirror controller for controlling an orientation of the deflection mirror based on detection data which is obtained using the position deviation detector and the angle deviation detector, so as to eliminate the position deviation from a reference irradiation position in the short-axis direction of the linear beam on a surface of the object to be processed.

Another aspect of the present invention is a laser annealing method for performing an annealing process on an object to be processed by shaping a laser beam into a linear beam with a linear cross section through a beam shaping optical system and by irradiating the object with the linear beam. In the laser annealing method, a position deviation from a reference position and an angle deviation from a reference angle of a laser beam before passing through the beam shaping optical system, in a direction corresponding to a short-axis direction of the linear beam are detected; and an orientation of a deflection mirror disposed in an optical path between a laser and the object to be processed is controlled based on the amount of each of the detected position deviation and angle deviation, so as to eliminate the position deviation from a reference irradiation position in the short-axis direction of the linear beam on a surface of the object to be processed.

In the above laser annealing apparatus and method, the position deviation and the angle deviation of the laser beam are detected and the orientation of the deflection mirror is controlled based on each data of the detected position deviation and angle deviation so as to eliminate the position deviation on the surface to be irradiated. That is to say, the direction of the beam is controlled by changing the orientation of the deflection mirror in accordance with the amount of each of the position deviation and the angle deviation. Thus, the position deviation (drift) on the surface to be irradiated can be suppressed, so that the irradiation unevenness caused by the drift occurring in the short-axis direction of the beam can be drastically reduced. Further, unlike the means disclosed in Patent Document 2, the detectors detect the position deviation and the angle deviation of the laser beam before passing through the beam shaping optical system. Therefore, another beam shaping unit is not necessary in addition to the beam homogenizer for irradiating a substrate, and the position deviation and the angle deviation can be detected with a relatively simple structure. Moreover, unlike the means disclosed in Patent Document 2, operation of the deflection mirror disposed in the optical path between the laser and the object corrects the drift; therefore, the propagation characteristic of the beam in the optical resonator is not affected.

The mirror controller in the laser annealing apparatus preferably includes a mirror drive device for swinging the deflection mirror and a mirror angle control device for controlling operation of the mirror drive device. The mirror angle control device stores a position correction table which shows a position deviation from a reference irradiation position on a surface to be irradiated, with respect to a position deviation of the laser beam; an angle correction table which shows a position deviation from the reference irradiation position on the surface to be irradiated, with respect to an angle deviation of the laser beam; and a mirror correction table which shows a beam moving distance on the surface to be irradiated, with respect to an orientation angle of the deflection mirror. With the use of the position correction table, the angle correction table, and the mirror correction table, the orientation angle of the deflection mirror for eliminating the position deviation in the short-axis direction of the linear beam on the surface to be irradiated is calculated.

In the above structure, the mirror angle control device calculates the orientation angle of the deflection mirror for eliminating the position deviation on the surface to be irradiated, with the use of the position correction table, the angle correction table, and the mirror correction table. Thus, the drift correction can be performed with high accuracy.

In the laser annealing apparatus, the deflection mirror is preferably disposed upstream of the beam shaping optical system in an optical path.

At the upstream position of the beam shaping optical system, the laser beam has small diameter; therefore, the deflection mirror disposed at this position is smaller than that disposed downstream of the beam shaping optical system. Accordingly, the mechanism for changing the orientation angle of the deflection mirror disposed at the aforementioned position can be made relatively small.

In accordance with the present invention, it is possible to reduce irradiation unevenness caused by the drift occurring in the short-axis direction of the beam, without adding a new beam shaping unit and affecting the propagation characteristic of the beam in the optical resonator.

DETAILED DESCRIPTION OF THE INVENTION

Figure 1:
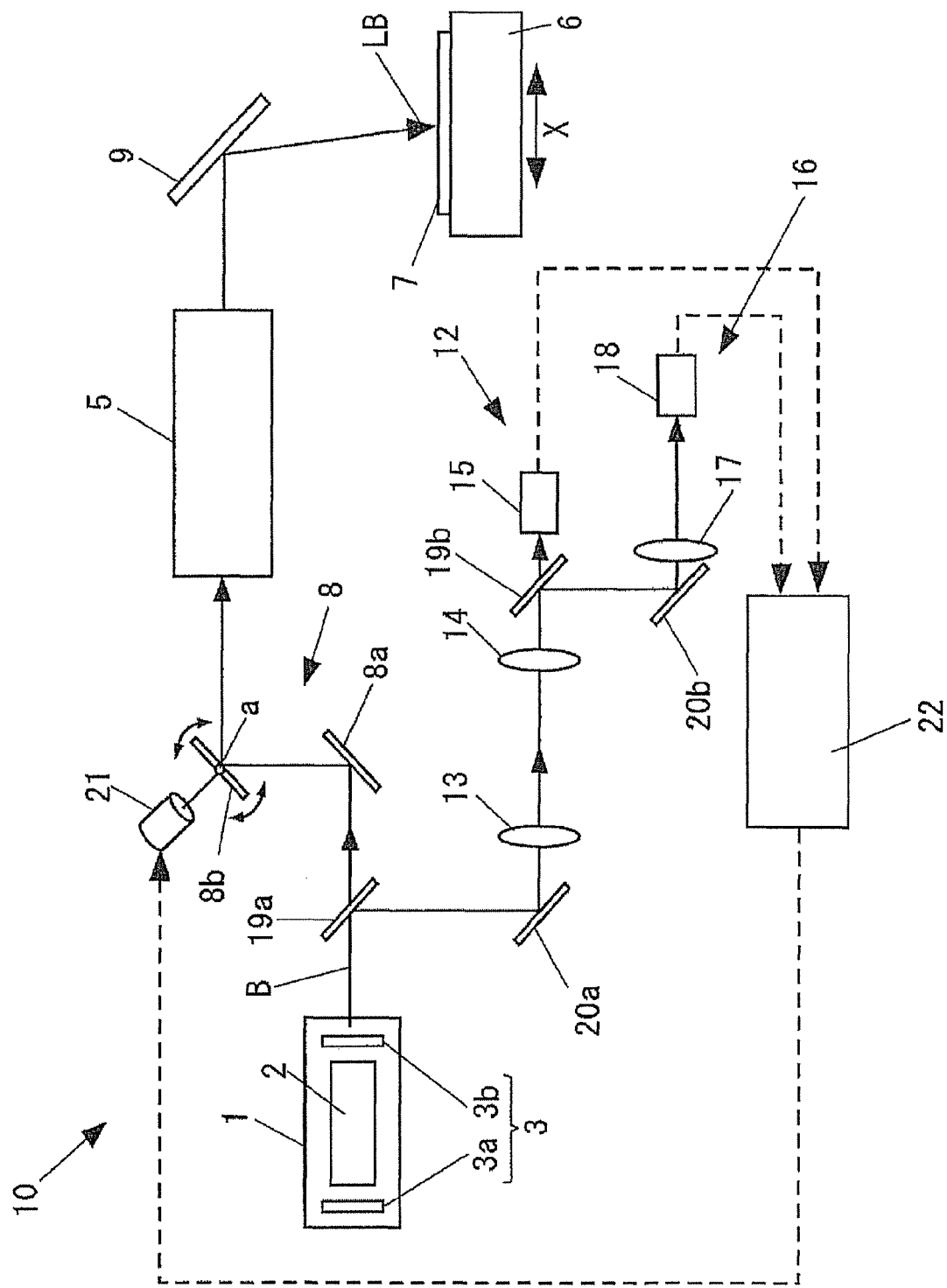
FIG. 1 illustrates the whole schematic structure of a laser annealing apparatus of an embodiment mode of the present invention.

An embodiment mode of the present invention will be described below in detail with reference to the accompanying drawings. Note that portions common in the drawings are denoted with the same reference numeral and description to such portions is not repeated.

FIG. 1 illustrates the whole schematic structure of a laser annealing apparatus 10 of the embodiment mode of the present invention. In FIG. 1, the laser annealing apparatus 10 includes a laser 1, an introduction mirror 8, a beam shaping optical system 5, a reflection mirror 9, and a substrate stage 6.

The laser 1 includes a laser medium 2 and an optical resonator 3. As examples of the laser medium 2, there are a solid-state laser medium, a gas laser medium, and a laser diode. As examples of the solid-state laser medium, there are YAG, YLF, $YVO_4$, and the like. As examples of the gas laser medium, there are excimer, $CO_2$, and the like. The optical resonator 3 includes a pair of reflection mirrors $3a$ and $3b$ disposed on opposite sides of the laser medium 2. The reflection mirror $3a$ on the back side is a total-reflection mirror, while the reflection mirror $3b$ on the emission side is a half mirror. In the laser 1 having the aforementioned structure, light is amplified between the pair of reflection mirrors $3a$ and $3b$ and then emitted as a laser beam B. The laser beam B may be either a continuous wave beam or a pulsed beam.

The introduction mirror 8 includes deflection mirrors $8a$ and $8b$ for deflecting the laser beam B and guides the laser beam B emitted from the laser 1 to the beam shaping optical system 5.

The beam shaping optical system 5 shapes the laser beam B emitted from the laser 1 into a beam (hereinafter referred to as a "linear beam LB") which has a linear cross section on a surface to be irradiated. In FIG. 1, the long-axis direction of the linear beam LB corresponds to a direction perpendicular to the paper. As the beam shaping optical system 5 used for obtaining such a linear beam LB, a structure which has been conventionally known can be employed. The beam shaping optical system 5 can be formed using, for example, a beam expander, a cylindrical lens, a cylindrical lens array, or the like.

The beam shaping optical system 5 preferably includes one of or both a beam homogenizer for the long-axis, which homogenizes the energy distribution (light intensity distribution) of the linear beam LB in the long-axis direction and a beam homogenizer for the short-axis, which homogenizes the energy distribution of the linear beam LB in the short-axis direction. In this case, each of the homogenizers for the long-axis and the short-axis can be a lens array type which uses a cylindrical lens array, a waveguide type which uses a waveguide, a type using a diffractive optical element, or any other types. The lens array type and the waveguide type are disclosed in, for example, Japanese Published Patent Application No. 2007-214527, and the diffractive optical element is disclosed in, for example, Japanese Published Patent Application No. 2005-217209.

The reflection mirror 9 reflects the linear beam LB in a direction toward the substrate 7, which is the object to be irradiated. The substrate stage 6 has a top surface on which a substrate 7 is mounted, and has a structure capable of moving in an X direction indicated by an arrow in the drawing, which corresponds to the short-axis direction of the linear beam LB. Thus, the linear beam LB can scan a desired region in such a manner that the substrate 7 mounted on the substrate stage 6 is moved in the X direction.

The substrate 7, which is the object to be irradiated with the linear beam LB, is a semiconductor substrate or a glass substrate. In the case of the semiconductor substrate, ions are added to a superficial portion of the substrate and the ions are activated by laser irradiation. In the case of the glass substrate, an amorphous semiconductor film (such as an amorphous silicon film) is formed on a surface thereof and modified into a crystalline semiconductor film by laser irradiation.

The emission of the laser beam B from the laser 1 and the operation of the substrate stage 6 are controlled by a control device which is not shown. Thus, the laser irradiation time (in the case of a pulsed laser, the total number of times of irradiation and the total irradiation time per unit area) to the substrate 7 is controlled.

In FIG. 1, the laser annealing apparatus 10 further includes a position deviation detector 12, an angle deviation detector 16, and a mirror controller (21 and 22).

The position deviation detector 12 detects a position deviation of the laser beam B before passing through the beam shaping optical system 5, from a reference position in a direction corresponding to the short-axis direction of the linear beam LB. The angle deviation detector 16 detects an angle deviation of the laser beam B before passing through the beam shaping optical system 5, from a reference angle in a direction corresponding to the short-axis direction of the linear beam LB. The mirror controller (21 and 22) controls the orientation of the deflection mirror 8b based on the detection data obtained using the position deviation detector 12 and the angle deviation detector 16, so as to eliminate the position deviation from a reference irradiation position in the short-axis direction of the linear beam LB on the surface to be irradiated.

Figure 2:
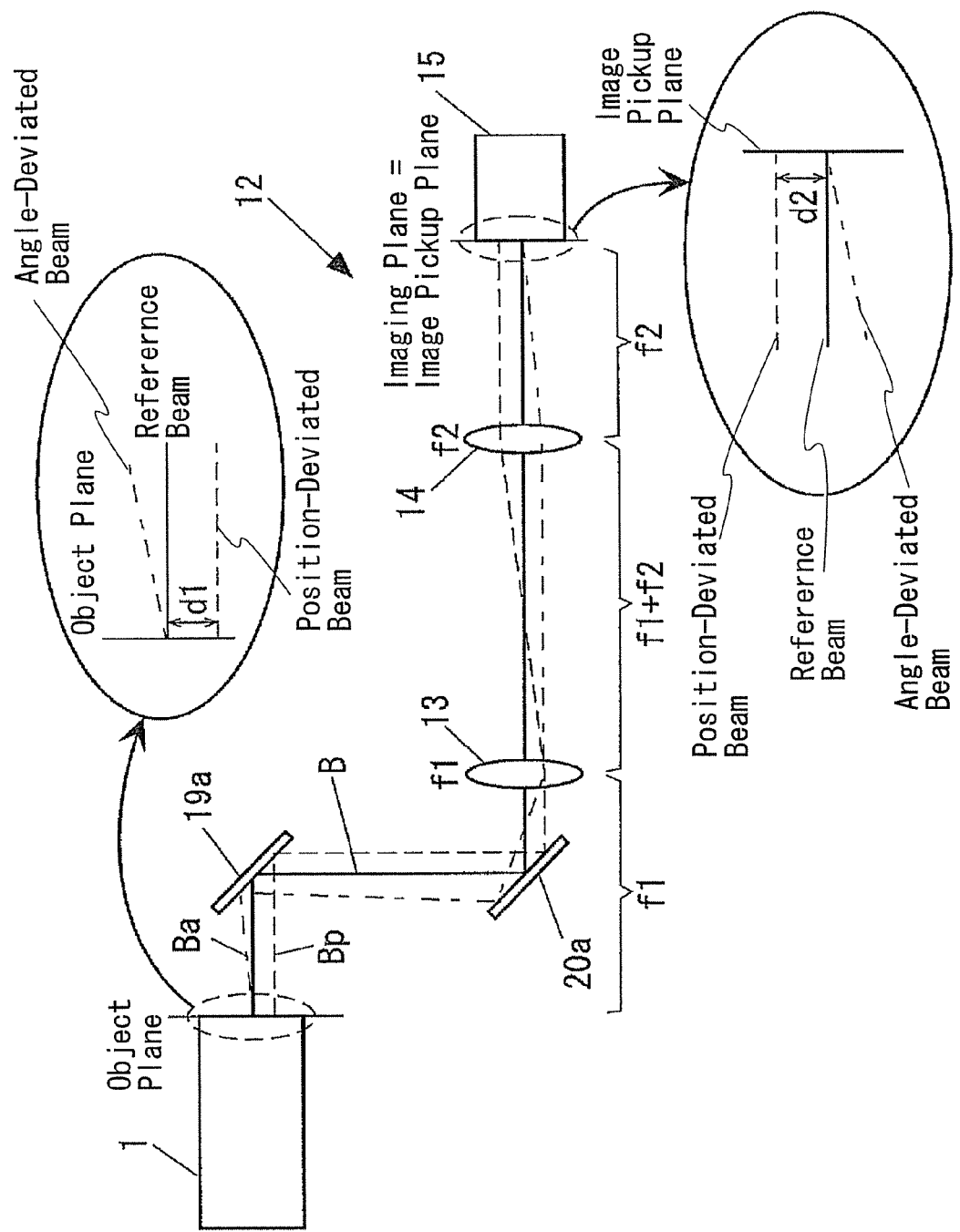
FIG. 2 illustrates a structure example of a position deviation detector.

One structure example of the position deviation detector 12 is described with reference to FIG. 2. A beam splitter 19a for splitting the laser beam B emitted from the laser 1 is disposed upstream of the beam shaping optical system 5. The part of the laser beam B that is reflected by the beam splitter 19a enters the position deviation detector 12. In FIG. 2, the part of the laser beam B that is reflected by the beam splitter 19a is deflected by the deflection mirror 20a; however, the deflection mirror 20a can be eliminated depending on the position of the position deviation detector 12.

In FIG. 2, a continuous line corresponds to the laser beam B, which is the reference beam. A dashed-line Bp indicates a position-deviated beam and a chain line Ba indicates an angle-deviated beam, based on the laser beam B.

In FIG. 2, the position deviation detector 12 includes a first lens 13 with a first focal length f1, a second lens 14 with a second focal length f2, and a first image pickup device 15 for position deviation detection. The first lens 13 is disposed at a position where the distance between its principal point and an object plane (which corresponds to an emission side surface of the laser 1 in this example) is equal to f1. The second lens 14 is disposed at a position where the distance between its principal point and the principal point of the first lens 13 is equal to the sum of f1 and f2. The first image pickup device 15 is disposed at a position where the distance between its image pickup plane and the principal point of the second lens 14 is equal to f2. As examples of the first image pickup device 15, there are a CCD image sensor and a CMOS image sensor.

With the first lens 13 and the second lens 14, which form an image translation optical system, an image at the object plane is magnified and translated to an imaging plane at a position which is f2 away from the principal point of the second lens 14. The magnification at this time is $d1/d2=f1/f2$. The image pickup plane of the first image pickup device 15 conforms to the aforementioned imaging plane; therefore, the translated image at the imaging plane can be observed with the first image pickup device 15. From the observation of this translated image, the amount of the position deviation can be detected but the amount of the angle deviation is not detected. The detection data obtained using the position deviation detector 12 is transmitted to the mirror angle control device 22.

Figure 3:
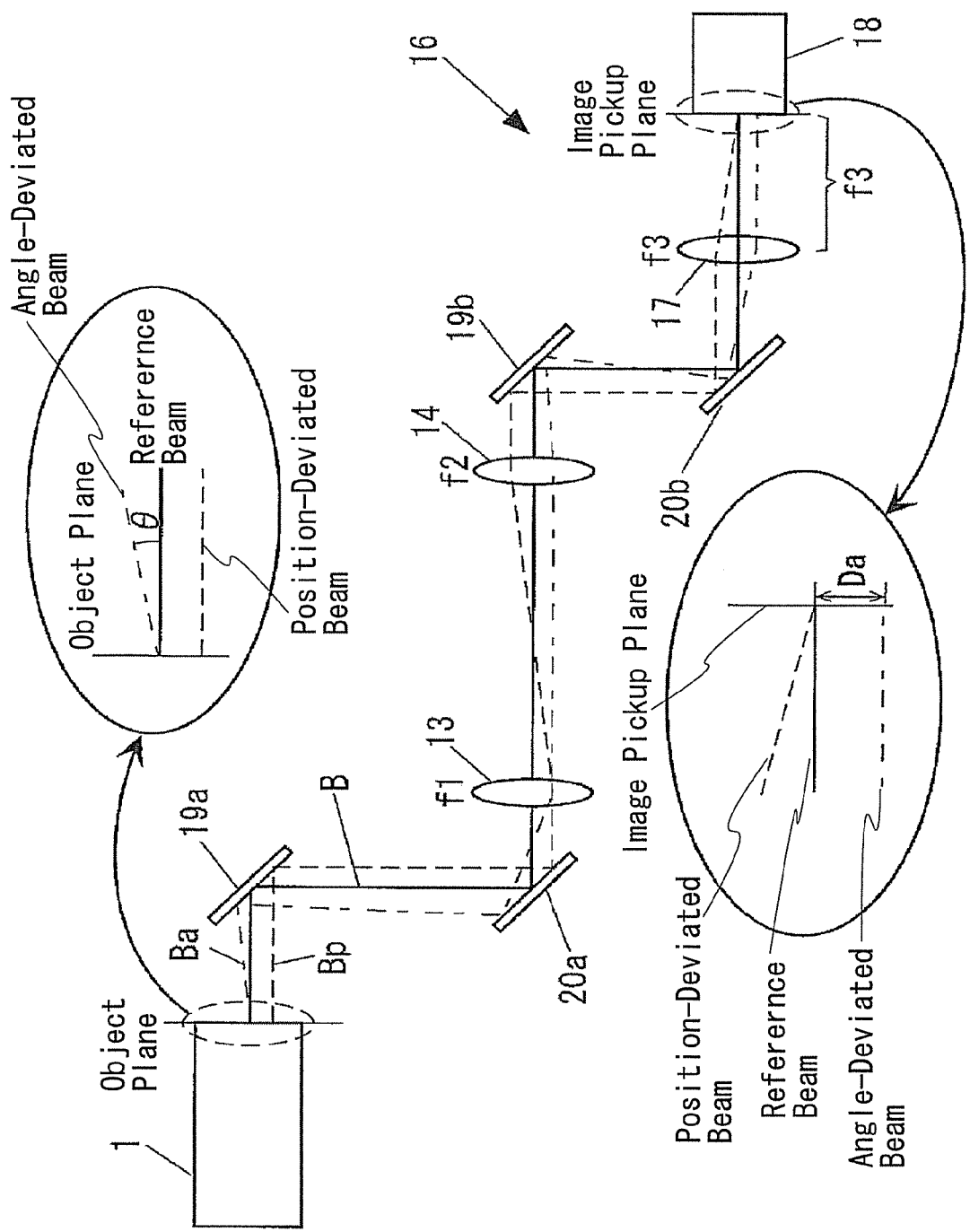
FIG. 3 illustrates a structure example of an angle deviation detector.

One structure example of the angle deviation detector 16 is described with reference to FIG. 3. The part of the laser beam B that is reflected by the beam splitter 19a is further split by a beam splitter 19b disposed on an emission side of the second lens 14 and enters the angle deviation detector 16. In FIG. 3, the part of the laser beam B that is reflected by the beam splitter 19b is deflected by the deflection mirror 20b; however, the deflection mirror 20b can be eliminated depending on the position of the angle deviation detector 16.

In FIG. 3, the angle deviation detector 16 includes the first lens 13 with a first focal length f1, the second lens 14 with a focal length f2, a third lens 17 with a third focal length f3, and a second image pickup device 18 for angle deviation detection. In FIG. 3, the angle deviation detector 16 shares the first lens 13 and the second lens 14 with the position deviation detector 12 but may have the first lens 13 and the second lens 14 independently from the position deviation detector 12. The second image pickup device 18 is disposed at a position where the distance between its image pickup plane and the principal point of the third lens 17 is equal to f3, which corresponds to the focal length of the third lens 17. As examples of the second image pickup device 18, there are a CCD image sensor and a CMOS image sensor.

In such a structure, $Da = f3 \cdot \tan\theta$, where $\theta$ is the amount of the angle deviation and Da is the amount of the position deviation at the image pickup plane based on the amount of the angle deviation θ. Therefore, the amount of the angle deviation θ at the object plane can be detected from the observation on the amount of the position deviation Da at the image pickup plane with the use of the second image pickup device 18. At this time, the amount of the position deviation is not detected. The detection data obtained using the angle deviation detector 16 is transmitted to the mirror angle control device 22.

The position of the object plane, which is the target of the image translation, is not limited to the emission side surface of the laser 1 as long as the position thereof is upstream of the beam shaping optical system 5. Therefore, the position of the object plane may be inside the laser 1 (but the outside of the reflection mirror 3b on the emission side) or downstream of the deflection mirror 8b. When the position of the object plane is inside the laser 1, the position deviation detector 12 and the angle deviation detector 16 may be arranged inside the laser 1, if possible.

In FIG. 1, the mirror controller (21 and 22) includes the mirror drive device 21 for swinging the deflection mirror and the mirror angle control device 22 for controlling the operation of the mirror drive device 21. The deflection mirror 8b is supported in such a manner that it can freely swing around an axis "a" which corresponds to a long-axis direction of the linear beam LB. The mirror drive device 21 changes the orientation angle of this deflection mirror 8b. The mirror drive device 21 can be formed using, for example, an AC servomotor.

The deflection mirror which the mirror drive device 21 swings is not limited to the deflection mirror 8b which is shown as an object to be driven in FIG. 1, as long as it is disposed in an optical path between the laser 1 and the substrate 7, which is an object to be irradiated. Therefore, the mirror drive device 21 may swing another deflection mirror 8a or the reflection mirror 9 which also has a function as a deflection mirror.

Based on the detection data obtained using the position deviation detector 12 and the angle deviation detector 16, the mirror angle control device 22 calculates the orientation angle of the deflection mirror 8b for eliminating the position deviation in the short-axis direction of the linear beam LB on the surface to be irradiated. Then, the mirror angle control device 22 transmits a control signal which corresponds to the calculated orientation angle, to the mirror drive device 21.

Figure 4A:
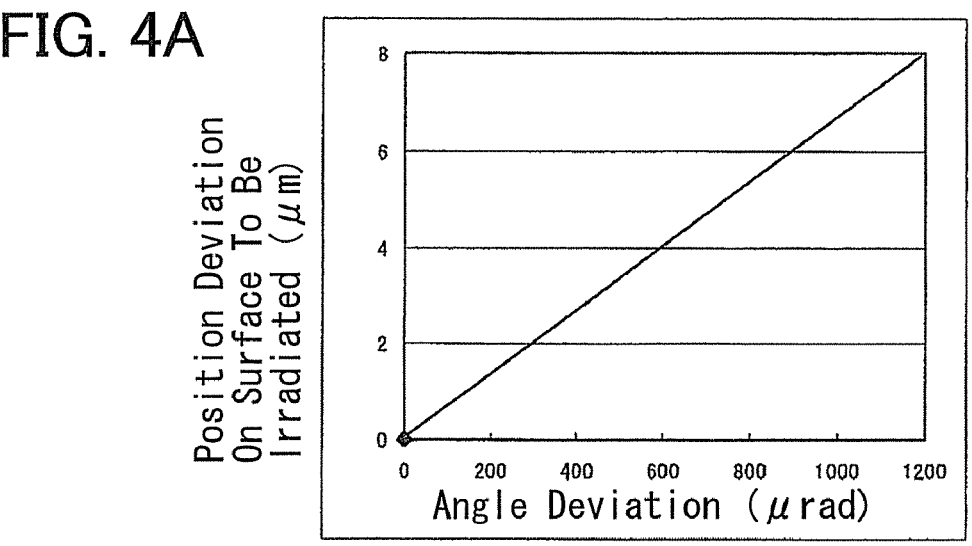
FIG. 4A shows a position deviation of a laser beam from a reference irradiation position on a surface to be irradiated, with respect to an angle deviation.
Figure 4B:
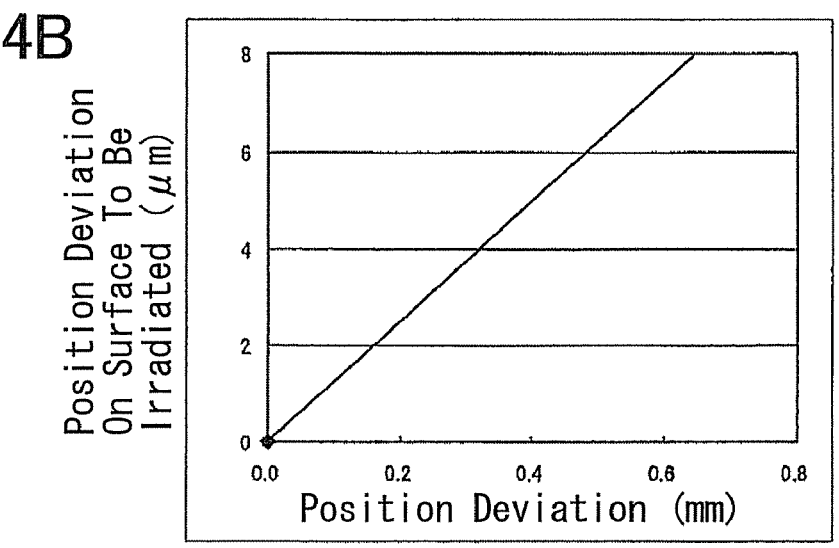
FIG. 4B shows a position deviation from a reference irradiation position on the surface to be irradiated, with respect to a position deviation.
Figure 4C:
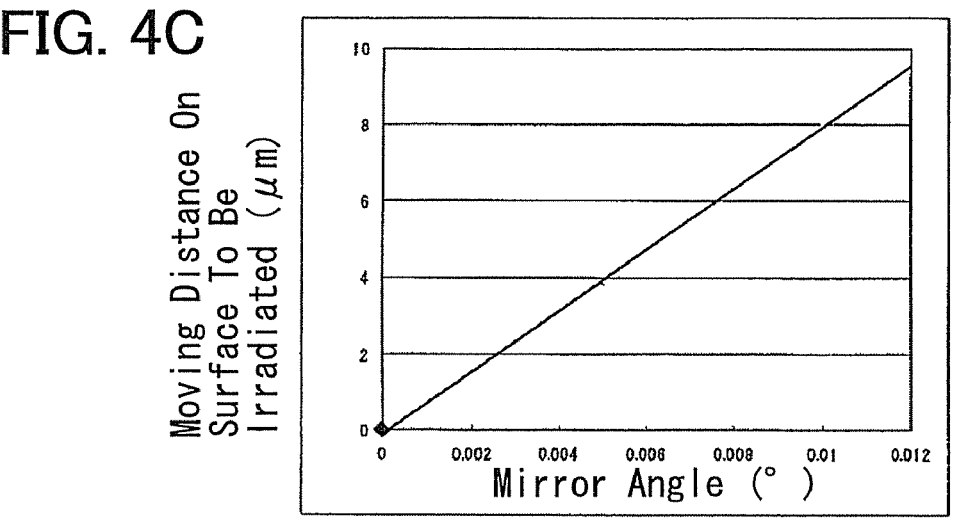
FIG. 4C shows a beam moving distance on the surface to be irradiated, with respect to an orientation angle of a deflection mirror.
Figure 5:
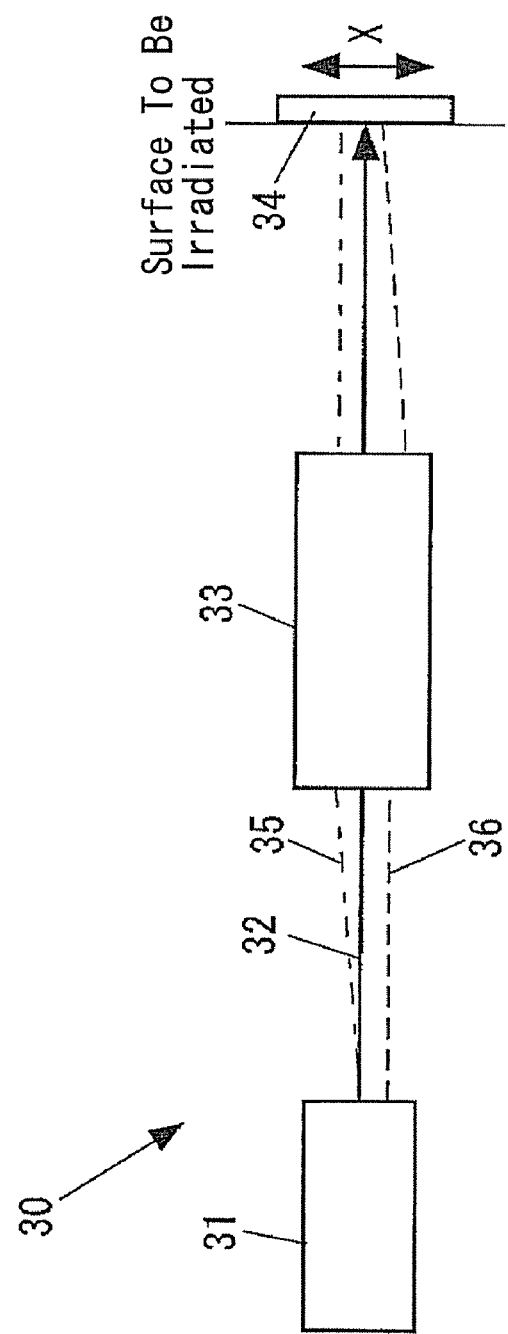
FIG. 5 schematically illustrates a conventional laser annealing apparatus.
Figure 6:
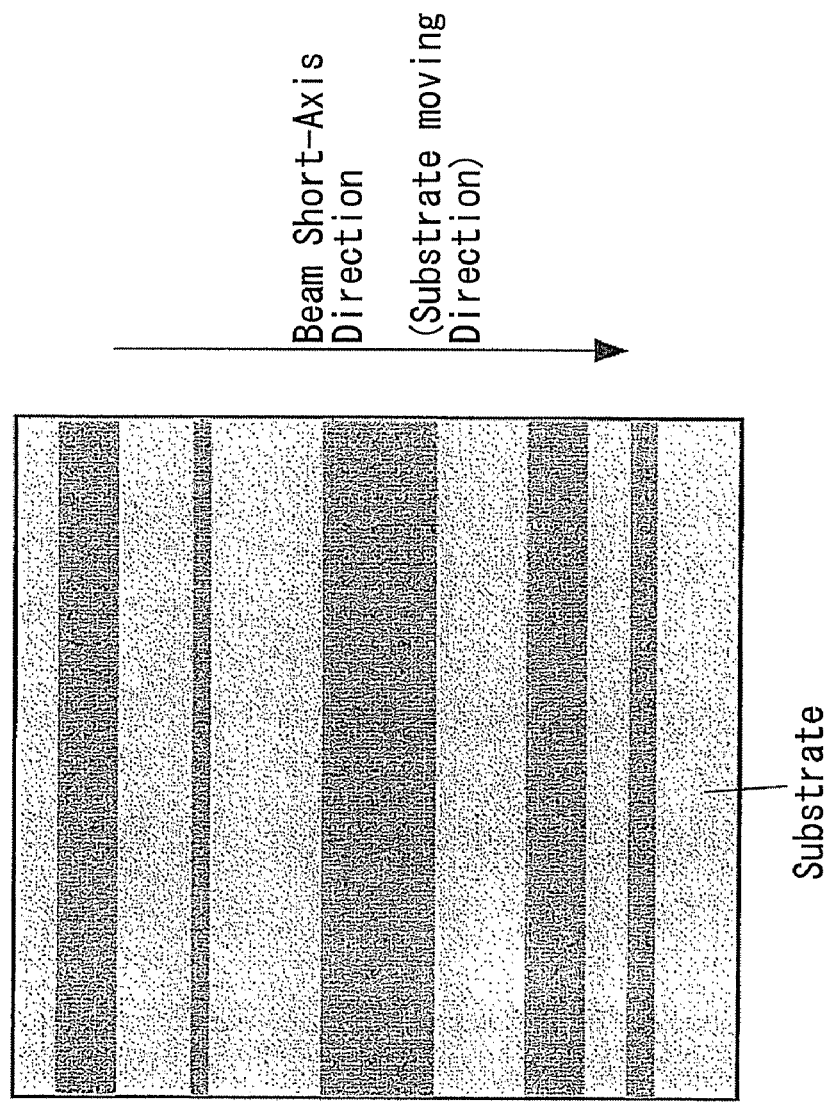
FIG. 6 illustrates-irradiation unevenness due to drift.
Figure 7:
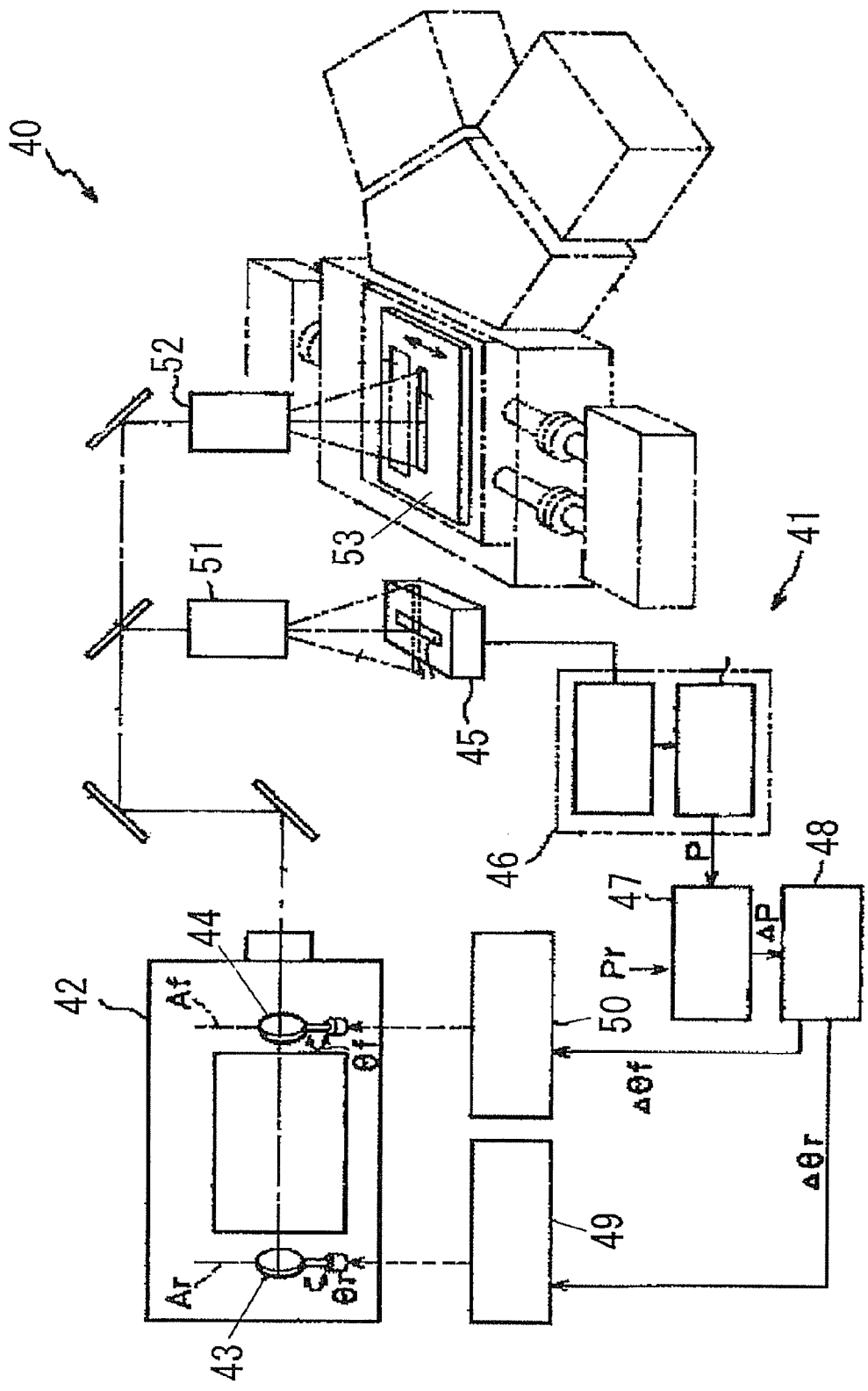
FIG. 7 illustrates the whole structure of a drift correction device of a laser process apparatus disclosed in Patent Document 2.

FIG. 4A shows a position deviation from a reference irradiation position on a surface to be irradiated, with respect to an angle deviation of the laser beam B. FIG. 4B shows a position deviation from a reference irradiation position on a surface to be irradiated, with respect to a position deviation of the laser beam B. FIG. 4C shows a beam moving distance on a surface to be irradiated, with respect to an orientation angle of the deflection mirror. The values in FIGS. 4A to 4C can be obtained from calculation or experiments. By putting these values into tables, the orientation angle of the deflection mirror 8b for eliminating the position deviation on the surface to be irradiated can be calculated.

In specific, the mirror angle control device 22 stores a position correction table which shows a position deviation from a reference irradiation position on a surface to be irradiated, with respect to a position deviation of the laser beam B; an angle correction table which shows a position deviation from the reference irradiation position on the surface to be irradiated, with respect to an angle deviation of the laser beam B; and a mirror correction table which shows the beam moving distance on a surface to be irradiated, with respect to an orientation angle of the deflection mirror. With the use of the position correction table, the angle correction table, and the mirror correction table, the orientation angle of the deflection mirror for eliminating the position deviation in the short-axis direction of the linear beam LB on the surface to be irradiated is calculated. Moreover, the mirror angle control device 22 transmits a control signal which corresponds to the calculated orientation angle, to the mirror drive device 21.

The mirror drive device 21 changes the orientation angle of the deflection mirror 8b in accordance with the control signal from the mirror angle control device 22. With the above structure, the position deviation and the angle deviation of the laser beam B are detected in real time to automatically control the orientation angle of the deflection mirror 8b; therefore, the drift correction on the surface to be irradiated can be performed in real time.

In the aforementioned laser annealing apparatus 10 and method of the present invention, the orientation of the deflection mirror 8b is changed in accordance with the amount of each of the position deviation and the angle deviation, whereby the direction of the laser beam B after the deflection mirror 8b is controlled. Accordingly, it is possible to suppress the position deviation (drift) on the surface to be irradiated and to reduce drastically the irradiation unevenness caused by the drift occurring in the short-axis direction of the beam.

Unlike the means disclosed in Patent Document 2, the detectors detect the position deviation and the angle deviation of the laser beam B before passing through the beam shaping optical system 5. Therefore, it is not necessary to provide a beam shaping unit in addition to a beam homogenizer for irradiating the substrate (the beam shaping optical system 5 in this embodiment mode). The position deviation and the angle deviation can be detected with the use of a relatively simple structure.

Furthermore, unlike the means disclosed in Patent Document 2, operation of the deflection mirror 8b disposed in an optical path between the laser 1 and the substrate 7, which is the object to be irradiated, corrects the drift; therefore, the propagation characteristic of the beam in the optical resonator 3 is not affected.

In this embodiment mode, the mirror angle control device 22 calculates the orientation angle of the deflection mirror 8b for eliminating the position deviation on the surface to be irradiated, with the use of the position correction table, the angle correction table, and the mirror correction table. Therefore, drift correction can be performed with high accuracy.

This embodiment mode employs the structure of swinging the deflection mirror 8b disposed upstream of the beam shaping optical system 5 in the optical path. The laser beam B has small beam diameter at a position upstream of the beam shaping optical system 5; therefore, the deflection mirror disposed at this position is smaller than the mirror (the reflection mirror 9 in this embodiment mode) disposed downstream of the beam shaping optical system 5. Therefore, the mirror drive device 21 can be made relatively small.

Note that, in the aforementioned structure, the beam scan is performed in such a manner that the beam irradiation position is fixed and the substrate 7 is moved in the short-axis direction of the beam. Alternatively, another structure may be employed in which the substrate position is fixed and the beam is moved in the short-axis direction to perform the beam scan. In the latter structure, for example, the beam scan can be performed in the short-axis direction of the beam by use of an fθ lens in combination with a galvanometer mirror or a polygon mirror as disclosed in Japanese Published Patent Application No. 2003-45820.

The embodiment mode of the present invention has been described; however, the embodiment mode of the present invention disclosed as above is just an example and the scope of the present invention is not limited to this embodiment mode. The scope of the present invention should be defined by the scope of claims and include the meaning which is equal to the scope of claims and all the modifications within the scope of claims.

This application is based on Japanese Patent Application serial no. 2008-013766 filed with Japan Patent Office on Jan. 24, 2008, the entire contents of which are hereby incorporated by reference.

What is claimed is:

1. A laser annealing apparatus comprising:
    a beam shaping optical system configured to shape a laser beam emitted from a laser into a liner beam with a linear cross section;
    a position deviation detector for detecting a position deviation of the laser beam emitted from the laser before passing through the beam shaping optical system, from a reference position;
    an angle deviation detector for detecting an angle deviation of the laser beam before passing through the beam shaping optical system, from a reference angle;
    a deflection mirror for deflecting the laser beam, which is disposed in an optical path between the laser and the beam shaping optical system; and
    a mirror controller for controlling an orientation of the deflection mirror based on detection data obtained using the position deviation detector and the angle deviation detector.

2. The laser annealing apparatus according to claim 1,
    wherein the mirror controller includes a mirror drive device for swinging the deflection mirror and a mirror angle control device for controlling operation of the mirror drive device,
    wherein the mirror angle control device stores a position correction table which shows a position deviation from a reference irradiation position on a surface to be irradiated, with respect to a position deviation of the laser beam; an angle correction table which shows a position deviation from the reference irradiation position on the surface to be irradiated, with respect to an angle deviation of the laser beam; and a mirror correction table which shows a beam moving distance on the surface to be irradiated, with respect to an orientation angle of the deflection mirror, and
    wherein the orientation angle of the deflection mirror for eliminating the position deviation on the surface to be irradiated is calculated using the position correction table, the angle correction table, and the mirror correction table.

3. The laser annealing apparatus according to claim 1,
    wherein the deflection mirror is disposed upstream of the beam shaping optical system in the optical path.

4. A laser annealing apparatus comprising:
    a beam shaping optical system configured to shape a laser beam emitted from a laser into a liner beam with a linear cross section;
    a position deviation detector for detecting a position deviation of the laser beam before passing through the beam shaping optical system, from a reference position in a direction corresponding to a short-axis direction of the linear beam;
    an angle deviation detector for detecting an angle deviation of the laser beam before passing through the beam shaping optical system, from a reference angle in a direction corresponding to the short-axis direction of the linear beam;
    a deflection mirror for deflecting the laser beam, which is disposed in an optical path between the laser and the beam shaping optical system; and
    mirror controller for controlling an orientation of the deflection mirror based on detection data obtained using the position deviation detector and the angle deviation detector, so as to eliminate the position deviation from a reference irradiation position in the short-axis direction of the linear beam on a surface to be irradiated.

5. The laser annealing apparatus according to claim 4,
    wherein the mirror controller includes a mirror drive device for swinging the deflection mirror and a mirror angle control device for controlling operation of the mirror drive device,
    wherein the mirror angle control device stores a position correction table which shows a position deviation from a reference irradiation position on a surface to be irradiated, with respect to a position deviation of the laser beam; an angle correction table which shows a position deviation from the reference irradiation position on the surface to be irradiated, with respect to an angle deviation of the laser beam; and a mirror correction table which shows a beam moving distance on the surface to be irradiated, with respect to an orientation angle of the deflection mirror, and
    wherein the orientation angle of the deflection mirror for eliminating the position deviation in the short-axis direction of the linear beam on the surface to be irradiated is calculated using the position correction table, the angle correction table, and the mirror correction table.

6. The laser annealing apparatus according to claim 4,
    wherein the deflection mirror is disposed upstream of the beam shaping optical system in the optical path.

7. A laser annealing method for performing an annealing process on an object to be processed, the method comprising:
    detecting a position deviation of a laser beam before passing through a beam shaping optical system, from a reference position and detecting an angle deviation of the laser beam before passing through the beam shaping optical system, from a reference angle
    controlling an orientation of a deflection mirror disposed in an optical path between a laser and the object, based on each amount of the position deviation and the angle deviation
    shaping the laser beam into a linear beam with a linear cross section through the beam shaping optical system; and
    irradiating the object with the linear beam.

* * * * *